United States Patent [19]
Tomlin, Jr.

[11] 3,715,598
[45] Feb. 6, 1973

[54] INTEGRAL FAULT DETECTION SYSTEM FOR OPERATING ELECTRONICS EQUIPMENT

[76] Inventor: Garland L. Tomlin, Jr., 2342 N. Oak Street, Falls Church, Va. 22046

[22] Filed: June 12, 1969

[21] Appl. No.: 832,565

[52] U.S. Cl. ............................................. 250/106 T
[51] Int. Cl. ............................................. G21h 5/02
[58] Field of Search..... 250/83, 83.3, 83.6 FT, 106 T, 250/43.5 R

[56] References Cited

UNITED STATES PATENTS 1,517,861  12/1924  Rosher ............................. 250/106
3,247,382  4/1966  Schneider ........................ 250/106 X

OTHER PUBLICATIONS

Materials Evaluation, "Kryptonates; A New Technique for the Detection of Wear", Cucchiaro et al., May, 1967, pp. 109–117.

Primary Examiner—James W. Lawrence
Assistant Examiner—Davis L. Willis
Attorney—Edgar J. Brower and Thomas O. Watson, Jr.

[57] ABSTRACT

An alarm or fault detection system for in service electronic equipment which is not electrically connected to the equipment is disclosed. A chemical tracer element which is responsive to the application of a certain force, physical stress, electrical stress, or heat, for example, is embedded in the equipment or portion thereof that is to be monitored. When the equipment's functional tolerance limit of the certain force is reached, the tracer element is released in a gaseous form. Presence of the tracer element's vapors in the equipment enclosure is detected by a transducer which responds to a particular vapor representing a particular component or equipment malfunction and indicates it to an observer.

8 Claims, 5 Drawing Figures

INVENTOR
GARLAND L. TOMLIN, JR.

BY Thomas O. Watson Jr.

ATTORNEY

INTEGRAL FAULT DETECTION SYSTEM FOR OPERATING ELECTRONICS EQUIPMENT

STATEMENT OF GOVERNMENT INTEREST

The invention described herein may be manufactured and used by or for Government of the United States of America for governmental purposes without the payment of any royalties thereon or therefor.

BACKGROUND OF THE INVENTION

The present invention relates to test systems for reporting the state of performance of operating electronic equipment, and more particularly, to test systems that provide malfunction information to an operator without being physically connected to the equipment being monitored.

Built-in or on-line test equipment is well known in the art for providing qualitative and quantitative information relating to the operational performance of the equipment being tested. To provide this information however, this test equipment requires test point access to the monitored equipment and a wiring harness to facilitate the attachment of the built-in or on-line test equipment. These integral and associated test systems usually can only isolate to a system's component level, such as to the black box level. The limitations of built-in test equipment arise from the requirement for additional space to accommodate the installation thereby precluding use of this space to increase operating capability of the system and increasing system operating weight. Further, there is a reduction in system operating reliability because of design requirements for test points that may necessitate circuit design changes.

To accommodate the requirements of test point circuits and the desired degree of malfunction isolation is a difficult engineering task because of the foregoing factors of design circuit changes and the consideration of weight and space accommodations.

SUMMARY OF INVENTION

The present invention requires no test point access to the equipment being monitored, occupies a minimum of space, and has negligible weight. The equipment malfunction or fault detector is placed in intimate contact with the component or subcomponent to be monitored. This malfunction detector is responsive to a malfunction in the monitored equipment by the mechanism of changing its state from a solid to a gaseous form. When such a change of state has occured, the gas vapors can be sensed by an appropriate gas detector which will indicate by an appropriate means that a fault or malfunction condition exists in a certain component or subcomponent of the equipment. The gas or vapor detector which serves as the ultimate malfunction indicator may be mounted within the equipment monitored or may be hand carried. The equipment malfunction detection means which is intimately associated with the component or subcomponent being monitored is a trace element which is physically incorporated with the component or subcomponent. This trace element is sensitive to the occurance of the particular failure mode that will affect the particular component or subcomponent of the electronic circuit. Upon such an occurrance, this trace element will, as previously stated, change its state and emit a distinctive vapor.

OBJECTS OF THE INVENTION

An object of this invention is to provide a method and apparatus for equipment malfunction detection for functioning electrical equipment which does not require an electrical connection to the equipment being monitored.

A further object of this invention is to provide an equipment malfunction detection system for functioning electronic equipment which does not require an electrical connection to the equipment being monitored and which requires a minimum of installation space and is of negligible weight.

A still further object of this invention is to provide a method and apparatus for equipment malfunction detection and indication for operating electronic equipment which does not require an electrical connection to the equipment being monitored and which generates negligible heat during its monitoring mode.

Another object of this invention is to provide a method and apparatus for equipment malfunction detection and indication for operating electronic equipment which does not require an electrical connection to the equipment being monitored and which is capable of isolating the malfunction to a particular circuit component.

Other objects, advantages and novel features of the invention will become apparent from the following detailed description of the invention when considered in conjunction with the accompanying drawings.

DESCRIPTION OF THE PREFERRED EMBODIMENTS

Figure 1:
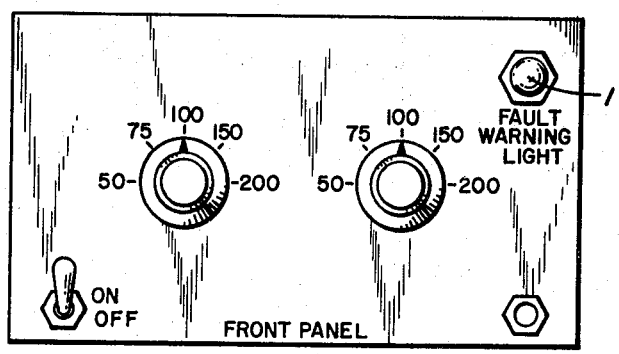
FIG. 1 illustrates a typical front panel of electronic equipment.

Referring to FIG. 1, reference is made to fault warning light 1 of FIG. 1. Upon the occurance of a malfunction within the equipment of FIG. 1 the light 1 will glow in a characteristic color indicating to a nearby operator that a fault has occurred.

Figure 2:
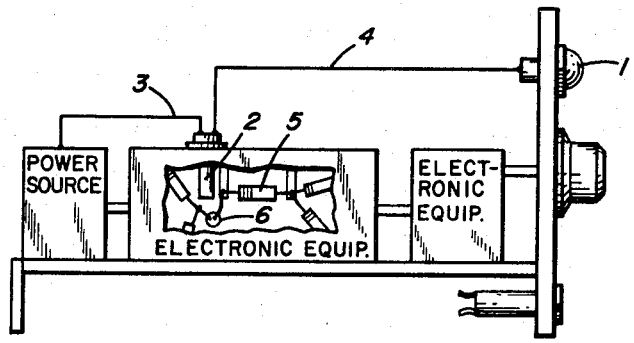
FIG. 2 illustrates a side view of the electronic equipment of FIG. 1.

As shown in FIG. 2, the malfunction sensor 2 is located within the component enclosure of the functioning electronic equipment. Malfunction sensor 2 can be a vapor or gas sensor such as is well known in the art and which utilizes vapor absorbing crystals that change their conductivity upon having absorbed a vapor having certain characteristics. As can be seen from FIG. 2, malfunction sensor 2 requires a power source connected by way of lines 3, which will actuate malfunction indicator light 1 upon the sensor 2 sensing the tracer element emitted gas vapors. The power source 4 for malfunction sensor 2 does not have to be part of the functioning electronic equipment but could, for example, consist of storage bateries. The tracer element which is the actual failure or malfunction detection means will be located on capacitor 6 or resistor 5, for example. Upon failure of these subcomponents, it will change state emitting a characteristic vapor that is of course detected by malfunction sensor 2.

It should also be noted that more than one malfunction sensor may be used per monitored equipment. If more than one sensor is used, each malfunction sensor would have its own characteristic warning light responsive to the sensor absorbing the vapor emitted from a characteristic tracer element which would be embodied within the subcomponent being monitored.

Figure 3:
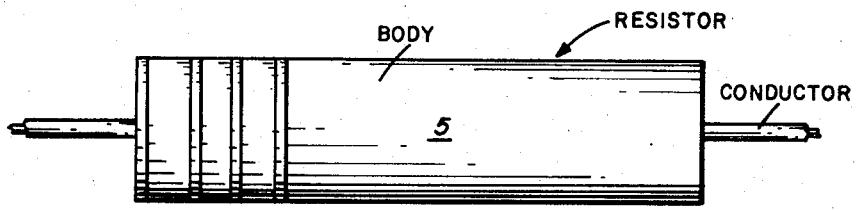
FIG. 3 illustrates a resistor.

FIG. 3 illustrates the body and connecting portions of a standard circuit resistor. The tracer element utilized to detect the malfunction of this resistor could be impregnated into the coating covering the body of the resistor or simply coating the body of the resistor or its conductor connecting elements. The resistor could be coated by the simple means of dipping the entire resistor into a special lacquer solution which has suspended in it minute particles of malfunction responsive tracer elements.

Figure 4:
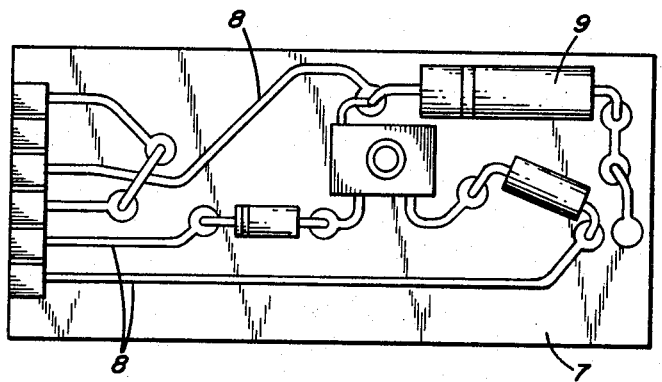
FIG. 4 illustrates a printed circuit board.

FIG. 4 illustrates a standard type of printed circuit board 7 having printed circuit conducting paths 8 and mounted upon it various electrical subcomponents such as resistor 9. The entire printed circuit board with all its subcomponents could be dipped into the special lacquer solution. Or just the subcomponent, such as resistor 9, may be coated. In this manner, the entire circuit board or just the subcomponent will be monitored for malfuction.

Figure 5:
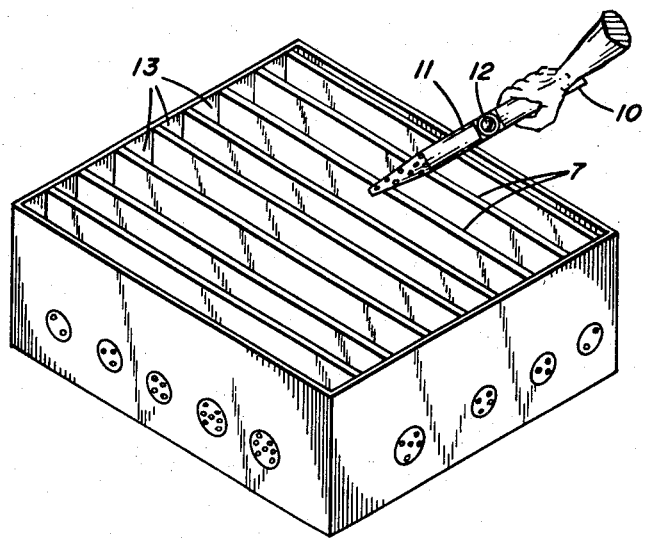
FIG. 5 illustrates a computer module which is being tested for the occurance of failure within it.

FIG. 5 illustrates a printed circuit computer module 13 in which there is a multitude of printed circuit boards 7 each performing a particular function required of a computer module. Each printed circuit board may be impregnated or coated with a tracer element having a different characteristic vapor upon its change of state. The failure of a particular circuit board can thus be detected by the vapor sensor 11 and a detection indicated by light 12 both of which are incorporated into a hand carried malfunction sensing device 10. It is further noted that the particular tracer element of this invention could be used not only for printed circuit boards but also for miniturized circuitry such as used in intergrated circuit components.

FIGS. 1 through 5 illustrate the various applications of the equipment malfunction sensing element in association with the malfunction detection element of the invention.

The equipment malfunction detection element or tracer element that is incorporated into the component or subcomponent of the electronic equipment to be monitored can be any of a variety of amine salts that are temperature responsive and decompose into their various components giving off characteristic vapors which may be detected. The variety of amine salts available for this purpose is immense. As an example of one type of amine salt that may be used for the instant invention, reference is made to U.S. Pat. No. 3,185,733 which discloses an amine salt of trimetaphosphenic acid. The methods of detecting amine vapors are well known in the art. As one example of such a method, reference is made to U.S. Pat. No. 3,025,142 which shows a solid chemical responsive to amine gas vapors which changes its color to indicate the presence of amine vapors. Other methods of detecting amine vapors are available. Reference is made to Volume 1, pages 429–440 of *Molecular Crystals* published in 1966 which discloses crystaline structures responsive to amine gas vapors so as to change their conductive characteristics upon absorption of such vapors.

The invention is not restricted to the use of amine salts or amine vapor gas detectors for detecting equipment malfunction and sensing equipment failure. A great variety of mildly radioactive materials are available which may be incorporated with a vehicle that is used to coat the particular component or subcomponent to be monitored. This mildly radioactive tracer material will be released and result in an increase radioactivity detected upon an equipment malfunction, such as excessive heat or stress, occurring in a particular component or subcomponent. This increase in radioactive action will and can be detected by the various and well known radiation counters available in the art, and still remain at a level of unquestionable safety.

As can thus be seen, the equipment malfunction detector which is responsive to the failure mode of the particular equipment component being monitored has physical but not electrical contact with the component, therefore removing the problems of designing test points into the electronic equipment. Also, the weight and volume assumed by a thin coating of this malfunction detection element is negligible as compared to the weight and volume of monitoring equipment requiring circuit test points for its operation. The malfunction sensor, whether it be a vapor sensor or a radiation counter of the giger type, may be mounted in proximity to the particular component or subcomponent to be monitored, or may be hand carried and used as a detector for a large number of equipment components.

Obviously, many modifications and variations of the present invention are possible in the light of the above teachings.

What is claimed is:

1. A method of detecting and indicating occurrence of a malfunction in operating electrical equipment comprising the steps of:
   associating a radioactive material in a first state which is responsive to equipment malfunction by changing to a second state, with equipment to be monitored for malfunction;
   sensing said change of state upon the occurrence of said equipment malfunction; and
   indicating an equipment malfunction in response to said sensing.

2. The method of claim 1 wherein the step of associating comprises the step of associating a radioactive material which is a solid in the first state.

3. The method of claim 1 wherein the step of sensing comprises the step of sensing a vapor which is the second state of the radioactive material.

4. The method for detecting and indicating occurance of a malfunction recited in claim 3 wherein said material is associated with said equipment by painting a solution containing said material suspended in a vehicle onto said equipment.

5. The method for detecting and indicating occurance of a malfunction recited in claim 3 wherein said material is associated with said equipment by embedding said material in the equipment structure.

6. An equipment malfunction detection and warning system for functioning electrical equipment comprising:
   an electrical equipment component;
   a radioactive malfunction sensing means incorporated in a solid state with the electrical equipment component for changing to a vapor state in response to an equipment malfunction; and a radiation detector means in proximity with said equipment component responsive to the changed state of said radioactive malfunction sensing means for indicating a malfunction of said component.

7. The system of claim 6 wherein the radioactive malfunction sensing means is impregnated into the covering of the electrical equipment component.

8. The system of claim 6 wherein the radioactive malfunction sensing means is a coating on the covering of the electrical equipment component.

* * * * *